(12) United States Patent
Maruyama et al.

(10) Patent No.: US 10,109,878 B2
(45) Date of Patent: Oct. 23, 2018

(54) ELECTROLYTE FILM FOR FUEL CELL

(71) Applicant: W. L. GORE & ASSOCIATES, CO., LTD., Tokyo (JP)

(72) Inventors: Masashi Maruyama, Tokyo (JP); Yoshikazu Yano, Tokyo (JP); Takeyuki Suzuki, Tokyo (JP); Tomoyuki Takane, Tokyo (JP)

(73) Assignee: W.L. Gore & Associates, Co., Ltd., Tokyo (JP)

( * ) Notice: Subject to any disclaimer, the term of this patent is extended or adjusted under 35 U.S.C. 154(b) by 0 days.

(21) Appl. No.: 15/517,707

(22) PCT Filed: Sep. 29, 2015

(86) PCT No.: PCT/JP2015/077550
§ 371 (c)(1),
(2) Date: Apr. 7, 2017

(87) PCT Pub. No.: WO2016/056430
PCT Pub. Date: Apr. 14, 2016

(65) Prior Publication Data
US 2017/0294670 A1    Oct. 12, 2017

(30) Foreign Application Priority Data

Oct. 10, 2014    (JP) .................................. 2014-209384

(51) Int. Cl.
*H01M 8/1004* (2016.01)
*H01M 8/1039* (2016.01)
(Continued)

(52) U.S. Cl.
CPC ........... *H01M 8/1039* (2013.01); *C08F 14/26* (2013.01); *H01M 8/103* (2013.01); *H01M 8/106* (2013.01);
(Continued)

(58) Field of Classification Search
CPC ........................... H01M 8/1004; H01M 8/106
See application file for complete search history.

(56) References Cited

U.S. PATENT DOCUMENTS

| 6,242,135 B1 | 6/2001 | Mushiake |
| 2001/0024755 A1 | 9/2001 | Bahar et al. |

FOREIGN PATENT DOCUMENTS

| JP | H9-219206 A | 8/1997 |
| JP | 1999-501964 A | 2/1999 |

(Continued)

OTHER PUBLICATIONS

Hsiu-Li Lin et al, "Preparation of a low proton resistance PBI/PTFE composite membrane" Journal of Power Sources, Dec. 22, 2006, vol. 164, pp. 481-487.

(Continued)

*Primary Examiner* — Olatunji A Godo
(74) *Attorney, Agent, or Firm* — Greenberg Traurig, LLP

(57) ABSTRACT

(Problem) To provide an electrolyte film for fuel cells, capable of achieving both low resistance (film thinning) and high dimensional stability.

(Solution) An electrolyte film for fuel cells, the electrolyte film comprising a polymeric electrolyte and a polytetrafluoroethylene (PTFE) porous film, characterized in that a material having an elastic modulus higher than that of the material constituting the PTFE porous film is composited on the inside surfaces of pores of the PTFE porous film, and the composited PTFE porous film has an elastic modulus of at least 150 MPa.

12 Claims, 1 Drawing Sheet

(51) Int. Cl.
*C08F 14/26* (2006.01)
*H01M 8/1069* (2016.01)
*H01M 8/103* (2016.01)
*H01M 8/1044* (2016.01)
*H01M 8/1051* (2016.01)
*H01M 8/106* (2016.01)
*H01M 8/1067* (2016.01)
*C01G 55/00* (2006.01)
*H01M 8/1081* (2016.01)
*H01M 8/1018* (2016.01)

(52) U.S. Cl.
CPC ....... *H01M 8/1044* (2013.01); *H01M 8/1051* (2013.01); *H01M 8/1067* (2013.01); *H01M 8/1079* (2013.01); *C01G 55/00* (2013.01); *C08F 2500/21* (2013.01); *H01M 8/1081* (2013.01); *H01M 2008/1095* (2013.01)

(56) References Cited

FOREIGN PATENT DOCUMENTS

| JP | 2004178995 | * | 6/2004 |
| JP | 2008-65988 A | | 3/2008 |
| JP | 2009-170244 A | | 7/2009 |
| JP | 2009-543949 A | | 12/2009 |
| JP | 2011-146291 A | | 7/2011 |
| WO | WO-98/11614 A1 | | 3/1998 |
| WO | WO-2011/107967 A2 | | 9/2011 |

OTHER PUBLICATIONS

Yu et al., "Preparation of PBI/H3PO4-PTFE Composite Membranes for High Temperature Fuel Cells", The Open Fuels & Energy Science Journal, 2010, 3, pp. 1-7.

Ahmet Kusoglu et al., "Aspects of Fatigue Failure Mechanisms in Polymer Fuel Cell Membranes", Polymer Physics, 2011, 49, 1506-1517.

Ahmet Kusoglu et al., "Mechanical response of fuel cell membranes subjected to a hygro-thermal cycle", Journal of Power Sources 161 (2006) 987-996.

International Search Report for Application No. PCT/JP2015/077550 dated Nov. 17, 2015.

* cited by examiner

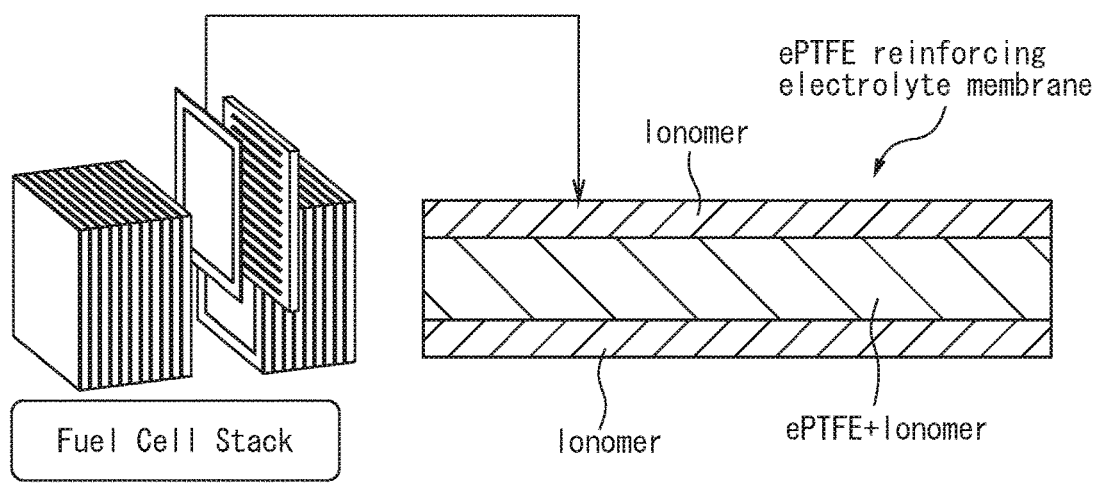

ELECTROLYTE FILM FOR FUEL CELL

The present application is a U.S. national-stage entry of PCT/JP2015/077550, filed on Sep. 29, 2015, and claims priority to Japanese Patent Application No. 2014-209384, filed on Oct. 10, 2014, which applications are incorporated herein by reference in their entirety.

TECHNICAL FIELD

The present invention relates to an electrolyte membrane for a fuel cell.

BACKGROUND ART

In recent years, a fuel cell has attracted attention as a high-efficiency energy conversion device. Fuel cells are roughly classified, by the type of the electrolyte used, into a low-temperature operating fuel cell such as an alkali type, a polymer electrolyte type and a phosphoric acid type, and a high-temperature operating fuel cell such as a molten carbonate type and a solid oxide type. Among these, a polymer electrolyte fuel cell (PEFC) using, as an electrolyte, a polymer electrolyte membrane having ion conductivity is attracting a lot of attention as a power source for stationary, vehicular, portable and other applications, because a high output density can be obtained with a compact structure and a simple system can be realized thanks to, for example, no use of a liquid for the electrolyte and the capability of operating at low temperatures.

In the polymer electrolyte fuel cell, the basic principle is that one surface of a polymer electrolyte membrane and the opposite surface are exposed to a fuel gas (e.g., hydrogen) and an oxidant gas (e.g., air), respectively, and reaction energy produced in the synthesis of water by a chemical reaction through the polymer electrolyte membrane is electrically extracted.

An assembly obtained by arranging a porous catalyst electrode on both surfaces of a polymer electrolyte membrane and integrally molding these members by means of a hot press, etc., is generally referred to as a membrane electrode assembly (MEA). The polymer electrolyte membrane has ion conductivity but does not have air permeability and electron conductivity and consequently, conducts only ions while physically and electronically insulating a fuel electrode from an oxygen electrode.

The polymer electrolyte membrane greatly affects the resistance and therefore, is required to have a smaller membrane thickness. A polymer electrolyte membrane is a very thin film-like material and difficult to handle, and wrinkles are often generated, for example, when joining it with an electrode or at the time of stacking a plurality of single cells and assembling the cells into a stack. A single cell or stack assembled using a polymer electrolyte membrane with wrinkles being generated therein has a high possibility of causing leakage of a reaction gas from the wrinkled region. In addition, the polymer electrolyte membrane is required to be than, and moreover, this member is the lowest in the mechanical strength among all constituent members constituting the stack and in turn, easily damaged even in the state absolutely free of wrinkles, etc. In the damaged portion of the electrolyte membrane, the electronic insulation or gas impermeability may be impaired. Accordingly, in order to enhance the reliability, maintain ability, etc., of the polymer electrolyte fuel cell, reinforcement of the polymer electrolyte membrane site is necessary.

RELATED ART

Patent Document

[Patent Document 1] Kohyo (National Publication of Translated Version) No. 11-501964
[Patent Document 2] Kokai (Japanese Unexamined Patent Publication) No. 2011-146291
[Patent Document 3] Kokai No. 2009-170244

Non-Patent Document

[Non-Patent Document 1] A. Kusoglu, et al., Mechanical response of fuel cell membranes subjected to a hygro-thermal cycle, *Journal of Power Sources*, 161 (2006), 987-996
[Non-Patent Document 2] A. Kusoglu, et al., Aspects of fatigue failure mechanisms in polymer fuel cell membrane, *Journal of Polymer Science*, Part B, 49 (2011), 1506-1517

SUMMARY OF THE INVENTION

Problems to be Solved by the Invention

As regards the reinforced polymer electrolyte membrane, for example, Patent Document 1 discloses a technique of impregnating expanded porous PTFE with an electrolyte material (ion-exchange resin) solution and then removing the solvent. By this technique, a reinforced polymer electrolyte membrane is obtained in the form of a composite membrane in which pores of the expanded porous PTFE are blocked with an ion exchange material (see, FIG. 1).

However, further reinforcement is required even for the reinforced polymer electrolyte membrane above. Swelling of the electrolyte material is a possible reason for this requirement. The solid electrolyte membrane (electrolyte material) used in the polymer electrolyte fuel cell is switched between a wet state and a dry state according to the operating condition and therefore, exposed to a dry-wet cycle attributable to the operating condition. At this time, the solid electrolyte membrane (electrolyte material) repeats swelling and shrinking, which is thought to be one of the causes of mechanical deterioration of the electrolyte membrane (Non-Patent Documents 1 and 2). In addition, there is a problem that the dimension of the polymer electrolyte membrane is changed according to the moisture state and that at the time of formation of the membrane electrode assembly, a positional or dimensional deviation of the catalyst layer may occur or wrinkles may be generated. The humidity in the ambient environment may be changed also at the time of production of the cell stack, leaving the possibility of causing a problem that a dimensional deviation of the polymer electrolyte membrane occurs or wrinkles are generated. The deviation or wrinkling of the electrolyte membrane may bring about deformation of MEA or separation of the electrolyte membrane from the electrode layer, leading to mixing of the oxidant gas and the fuel gas (cross-leak) or leakage of a fuel to the oxygen electrode side from the fuel electrode side, and as a result, the function as a cell may be lost.

On the other hand, thinning of the thin-film polymer electrolyte membrane is also demanded so as to achieve a high output density of a fuel cell stack or reduce the cost. It is difficult to satisfy both thinning of the electrolyte membrane and assurance of sufficient durability in the dry-wet cycle.

In Document 2, hydrogen peroxide produced due to cross-leakage between hydrogen of the fuel and oxygen of the oxidant or a hydroxy radical derived from the hydrogen peroxide is considered to cause deterioration of the electrolyte membrane, and in order to prevent the deterioration, a method of attaching a radical scavenger ($CeO_2$) to the surface and inside of a reinforcing membrane (PTFE) and then impregnating the reinforcing membrane with an electrolyte, thereby producing an electrolyte membrane, is disclosed. According to this method, it is expected that radicals can be effectively trapped and the electrolyte membrane can be prevented from deteriorating due to radicals. However, this method does not lead to solving the problem of swelling and shrinking of the electrolyte by strengthening the reinforcing membrane (PTFE).

Document 3 discloses an electrolyte membrane where a ceramic porous body-containing layer (second reinforcing material) is stacked on both surfaces of a PTFE expanded porous membrane (first reinforcing material) and the stack is entirely encapsulated by an electrolyte resin. It is expected that the first reinforcing material suppresses the membrane elongation and the second reinforcing material suppresses the membrane shrinkage. However, the second reinforcing material is a ceramic porous body-containing layer and its average porosity is as low as 40%, resulting in a problem that the proportion of the electrolyte material in the electrolyte membrane is low and the resistance between electrodes is high.

In consideration of these problems, an object of the present invention is to provide an electrolyte membrane for a fuel cell which can satisfy both low resistance (thinning) and high dimensional stability.

Means to Solve the Problems

The present invention provides the following.

[1] An electrolyte membrane for a fuel cell, comprising a polymer electrolyte and a polytetrafluoroethylene (PTFE) porous membrane, wherein:
a material higher in the modulus of elasticity than a material constituting the PTFE porous membrane is compounded with the inner pore surface of the PTFE porous membrane and the compounded PTFE porous membrane has a modulus of elasticity of 150 MPa or more in at least one direction (MD: Machine Direction or TD: Traverse Direction) or in both directions (MD and TD).

[2] The electrolyte membrane according to item [1], wherein the polymer electrolyte is a fluorinated ionomer.

[3] The electrolyte membrane according to item [1] or [2], wherein PTFE constituting the PTFE porous membrane is expanded porous PTFE.

[4] The electrolyte membrane according to any one of items [1] to [3], wherein the material having a high modulus of elasticity contains at least one of $SiO_x$, $P_2O_5$, PbO, SrO, BaO and $ZrO_2$.

[5] The electrolyte membrane according to any one of items [1] to [4], wherein the material having a high modulus of elasticity contains polybenzimidazole (PBT).

[6] The electrolyte membrane according to any one of items [1] to [5], wherein the content of the material having a high modulus of elasticity is from 1.0 to 11 wt % based on the PTFE porous membrane.

[7] The electrolyte membrane according to any one of items [1] to [6], which further contains a catalyst having a radical-decomposing function.

[8] The electrolyte membrane according to item [7], wherein the catalyst having a radical-decomposing function contains at least one of cerium, tungsten, ruthenium, palladium, silver, rhodium, zirconium, yttrium, manganese, molybdenum, lead, vanadium and titanium.

Effects of the Invention

The electrolyte membrane of the present invention contains a compounded PTFE porous membrane, and thanks to a high modulus of elasticity of the porous membrane, swelling (expansion) due to humidification or shrinking due to drying is suppressed to reduce mechanical deterioration of the electrolyte membrane, and as a result, an electrolyte membrane with excellent dimensional stability is realized.

Furthermore, since compounding is performed on the inner pore surface of the PTFE porous membrane, the PTFE porous membrane itself is substantially free from a change in the dimension and porosity, so that the compounded PTFE membrane can have a high porosity (in other words, a low density) while greatly increasing in the strength (modulus of elasticity) and therefore, can be efficiently impregnated with an electrolyte material. As a result, an electrolyte membrane with high proton conductivity and low resistance is realized.

BRIEF DESCRIPTION OF THE DRAWINGS

FIG. 1 A conceptual diagram of a fuel cell stack and an electrolyte membrane.

MODE FOR CARRYING OUT THE INVENTION

The electrolyte membrane for a fuel cell according to the present invention is an electrolyte membrane for a fuel cell, containing a polymer electrolyte and a polytetrafluoroethylene (PTFE) porous membrane, wherein:
a material higher in the modulus of elasticity than a material constituting the PTFE porous membrane is compounded with the inner pore surface of the PTFE porous membrane and the compounded PTFE porous membrane has a modulus of elasticity of 150 MPa or more in at least one direction (MD or TD) or in both directions (MD and TD).

The electrolyte membrane for a fuel cell according to the present invention contains a polymer electrolyte and a polytetrafluoroethylene (PTFE) porous membrane.

The PTFE porous membrane is excellent in the heat resistance and chemical resistance and is a preferable material as a material for a fuel cell and at the same time, this membrane has a microporous structure characterized by nodes connected to each other by fibrils or a microporous structure characterized by fibrils without nodes. The microporous structure above is substantially impregnated with the polymer electrolyte, and the electrolyte membrane exhibits electron insulation and gas impermeability. The polymer electrolyte has ion conductivity, and therefore, an ion can move between a fuel electrode and an oxygen electrode. The PTFE porous membrane fulfills a role in reinforcing the polymer electrolyte and can increase the strength as an electrolyte membrane to enable more reduction in the thickness of the electrolyte membrane (as compared with an electrolyte membrane formed of only a polymer electrolyte material), and thanks to reduction in the thickness, the resistance to proton transport can be reduced. Accordingly, the electrolyte membrane for a fuel cell of the present invention can afford lower resistance while having high strength.

The polymer electrolyte is not particularly limited as long as it is a material having ion (proton) conductivity and being electron-insulating and gas-impermeable. As a representative example of known polymer electrolyte materials, the polymer electrolyte may be a fluorinated ionomer, which is a resin having a fluorine-containing polymer as a framework and containing a group such as a sulfonic acid group, a carboxyl group, a phosphoric acid group and a phosphoric group.

The thickness of the solid electrolyte membrane greatly affects the resistance and therefore, is required to be smaller as long as the electronic insulation and gas impermeability are not impaired, and the thickness is specifically from 1 to 100 µm, preferably from 5 to 50 µm.

The material of the polymer electrolyte for use in the present invention is not limited to a perfluorinated ionomer but may be a mixture with a hydrocarbon-based ionomer or an inorganic polymer ionomer or may be a partially fluorinated ionomer containing both a C—H bond and a C—F bond in the polymer chain. Specific examples of the hydrocarbon-based ionomer include: polyamide, polyacetal, polyethylene, polypropylene, acrylic resin, polyester, polysulfone, polyether, etc. into which an electrolyte group such as a sulfonic acid group is introduced, and their derivatives (aliphatic hydrocarbon-based polymer electrolyte); polystyrene, aromatic ring-containing polyamide, polyamide imide, polyimide, polyester, polysulfone, polyetherimide, polyethersulfone, polycarbonate, etc. into which an electrolyte group such as a sulfonic acid group is introduced, and their derivatives (partially aromatic hydrocarbon-based ionomer) and polyether ether ketone, polyether ketone, polyethersulfone, polycarbonate, polyamide, polyamideimide, polyester, polyphenylene sulfide, etc. into which an electrolyte group such as a sulfonic acid group is introduced, and their derivatives (fully aromatic hydrocarbon-based ionomer). Specific examples of the partially fluorinated ionomer include a polystyrene-graft-ethylene tetrafluoroethylene copolymer, a polystyrene-graft-polytetrafluoroethylene, etc. into which an electrolyte group such as a sulfonic acid group is introduced, and their derivatives. Specific examples of the perfluorinated ionomer include a Nafion (registered trademark) membrane (produced by DuPont), an Aciplex (registered trademark) membrane (produced by Asahi Easel), and a Flemion (registered trademark) membrane (produced by Asahi Glass), which are perfluoropolymers having a sulfonic acid group in the side chain. As for the inorganic polymer compound, a siloxane- or silane-based, in particular an alkylsiloxane-based, organic silicon polymer compound is suitable, and specific examples thereof include polydimethylsiloxane and γ-glycidoxypropyitrimetoxysilane.

The PTFE porous membrane is used for reinforcing the polymer electrolyte. PTFE is a fluororesin excellent in the heat resistance, corrosion resistance and processability. PTFE can be formed into a membrane by various known methods such as extrusion molding and bead rolling. By appropriately combining rolling and expanding, the PTFE membrane can be made to have very fine pores and contain a polymer electrolyte in the fine pores. Among others, the porosity can be freely adjusted by expanding the PTFE membrane. In this regard, the porous PTFE may be expanded porous PTFE.

The lower limit of the porosity of the PTFE porous membrane may be 35% or more, preferably 40% or more, 50% or more, 60% or more, 70% or more, or 80% or more. The upper limit of the porosity may be 97% or less, 95% or less, 90% or less, 80% or less, 70% or less, 60% or less, or 50% or less. If the porosity is less than 35%, the impregnated amount of the polymer electrolyte is small and, for example, when in use for a fuel cell, the power generation performance is insufficient. Conversely, if the porosity exceeds 97%, the effect of reinforcing the electrolyte membrane is insufficient.

The average pore diameter of the porous PTFE is generally from 0.01 to 50 µm, preferably from 0.05 to 15 µm, more preferably from 0.1 to 3 µm. If the average pore diameter is less than 0.01 µm, it may be difficult to impregnate a reinforcing material with a polymer electrolyte to be reinforced. Conversely, if the average pore diameter exceeds 50 µm, the effect of reinforcing the electrolyte membrane is insufficient.

The membrane thickness of porous PTFE is generally from 1 to 30 preferably from 2 to 20 µm. If the membrane thickness is less than 1 µm, the effect of reinforcing the electrolyte membrane may be insufficient. Conversely, if the membrane thickness exceeds 30 µm, the proportion of the electrolyte material in the electrolyte membrane is relatively decreased, and the resistance between electrodes may be increased.

In the present invention, a material higher in the modulus of elasticity than a material constituting the PTFE porous membrane is compounded with the inner pore surface of the PTFE porous membrane. The compounded PTFE porous membrane has a modulus of elasticity of 150 MPa or more in at least one direction (MD or TD)) or in both directions (MD and TD). The modulus of elasticity as used herein is a modulus of elasticity when the tensile speed is 200 mm/min and the elongation is 2%.

A polymer electrolyte is switched between a wet state and a dry state according to the operating condition and therefore, repeats a dimensional change (swelling and shrinking), which is thought to be one of the causes of mechanical deterioration of an electrolyte membrane. In the present invention, the PTFE porous membrane is compounded with a material higher in the modulus of elasticity than the PTFE porous membrane, whereby the modulus of elasticity of the PTFE porous membrane is increased. The compounded PTFE porous membrane has a modulus of elasticity of 150 MPa or more in at least one direction (MD or TD) or in both directions (MD and TD). The modulus of elasticity can be further increased according to the conditions required, and even a modulus of elasticity of 300 MPa or more can be achieved. If the modulus of elasticity is less than 150 MPa, swelling and shrinking of the polymer electrolyte cannot be sufficiently suppressed.

With a high modulus of elasticity, a dimensional change is less likely to occur, and mechanical deterioration of the electrolyte membrane can be suppressed. In addition, the electrolyte membrane has an ability to substantially or completely recover the original dimension even when a dimensional change is temporarily caused, and therefore, a problem of permanent misalignment in the dimension or generation of wrinkles does not occur.

Furthermore, in the reinforcing material (compounded PTFE porous membrane) of the present invention, for concurrently satisfying a low density in addition to the high modulus of elasticity, the inner pore surface of a reinforcing material (PTFE porous membrane) having a low density and a high porosity is coated with a material having a high modulus of elasticity. By this configuration, a compounded reinforcing material having a high modulus of elasticity and a high porosity can be obtained.

Compounding the inner pore surface of a PTFE porous membrane with a material having high modulus of elasticity is described in more detail. The microstructure of the PTFE porous membrane is constituted by fine fibrils called a fibril and granular knots connecting the fibrils called nodes, and very fine cavities continuously connecting with each other are present between a fibril and a node to form a so-called continuous porous structure.

In the present invention, a material higher in the modulus of elasticity than a material constituting the PTFE porous membrane is compounded to cover the framework composed of the fibril and the node, but the continuous porous structure is maintained, because the thickness of the compounded material is small compared with the size of the fibril or node and a void in a gap between a fibril and a node is still present. More specifically, the compounded porous PTFE can maintain a porous structure substantially equivalent to that of the porous PTFE before the compounding, so that the compounded PTFE membrane can have a high porosity (in other words, a low density) while greatly increasing in the strength (modulus of elasticity) and therefore, can be efficiently impregnated with an electrolyte material. As a result, an electrolyte membrane with high proton conductivity and low resistance is realized.

The compounding material having a high modulus of elasticity is not particularly limited as long as it can enhance the modulus of elasticity, but since this is used inside a fuel cell, a material that is sparingly soluble in water and exists relatively stably in an acidic atmosphere is preferred. For example, in the case of an inorganic material, the material having a high modulus of elasticity may contain at least one of $SiO_x$, $P_2O_5$, PbO, SrO, BaO and $ZrO_2$ (wherein a may be $0 \leq x \leq 2$). In the case of an organic material, the material having a high modulus of elasticity may contain polybenzimidazole (PBI).

The content percentage of the compounding material having a high modulus of elasticity may be from 1.0 to 11 wt % based on the PTFE porous membrane. This proportion can be appropriately changed according to the use, purpose, processing method, etc. Preferably, the lower limit may be 2% or more, 4% or more, or 6% or more. Preferably, the upper limit may be 9% or less, 7% or less, or 5% or less. If the content percentage is less than 1.0 wt %, the effect of increasing the modulus elasticity by the compounding is not sufficiently obtained. If the content percentage exceeds 11%, the effect of increasing the modulus elasticity reaches saturation and on the other hand, pores of the PTFE porous membrane are prone to blocking, leading to a fear that the proportion of the polymer electrolyte is relatively decreased and the resistance is increased.

The method for compounding the inner pore surface of the PTFE porous membrane with a compounding material having a high modulus elasticity is not particularly limited, and a solution containing a material having a high modulus of elasticity may be applied by using a method such as coating, dipping and spraying. The compounded PTFE porous membrane is air-dried or heat-treated to evaporate the solvent.

The compounding material having a high modulus of elasticity can be prepared in an arbitrary form, e.g., a coating solution using an organic solvent, an aqueous emulsion, or an aerosol, according to the conventional method. As the solvent of the coating solution, a preferable solvent may be selected from the standpoint of solubility or dispersibility of the material having a high modulus of elasticity. In view of wettability to the PTFE porous membrane to which the coating solution is applied, the solvent of the coating solution may be a fluorine-based solvent. Examples of the fluorine-based solvent are illustrated below, but the present invention is not limited to these examples.

A polyfluoroaromatic compound such as perfluorobenzene and hexafluorometaxylene, a polyfluorotrialkylamine compound such as perfluorotributylamine and perfluorotripropylamine, a polyfluoroalkane compound such as perfluorohexane, perfluorooctane, (perfluoro-n-octyl)ethane and perfluoro(2,3,5-trimethylhexane), a polyfluoroolefin compound such as (perfluoro-n-octyl)ethylene, a polyfluorocycloalkane compound such as perfluorocyclohexane and perfluorodecalin, a polyfluorocyclic ether compound such as perfluoro(2-butyltetrahydrofuran), a chlorofluorocarbon such as trichlorotrrfluoroethane, a chlorofluorohydrocarbon such as 1,3-dichloro-1,1,2,2,3-pentafluoropropane and 1,1-dichloro-2,2,3,3,3-pentafluoropropane, and a fluorine-containing low-molecular-weight polyether. These solvents may be used individually or as a mixture.

The inner pore surface of the PTFE porous membrane may be compounded with a material having a high elasticity by using a sol-gel method. In the sol-gel method, a particle (sol) dissolving in the form of a colloidal dispersion is formed by condensation, starting from a molecule having a group to be hydrolyzed. This sol can be used as a liquid coating material usually by not allowing the complete progress of a condensation reaction. After coating the inside of a fine pore with the sol to a desired extent, a structure produced by condensation is built (gel). At the time of condensation, another crosslinking mechanism (for example, polymerization of an organic functional group) may also be used, if desired. The resulting gel is heat-treated or vacuum-treated to remove the solvent remaining in the inside and accelerate further densification. In this way, the inner surface of a fine pore can be coated with a material having a high modulus of elasticity. The sol-gel method is preferably used for the compounding with $SiO_x$, etc. Compared with other methods for compounding $SiO_x$, etc. (e.g., a molten glass method and a powder sintering method), the compound material can be easily produced at a low temperature with the sol-gel method. In addition, the compound material can be produced at a low temperature by utilizing a chemical reaction, so that an organic material (PTFE) and an inorganic material (e.g., $SiO_x$) can be compounded.

The electrolyte membrane of the present invention may further contain a catalyst having a radical-decomposing function. The catalyst having a radical decomposing function is a catalyst that suppresses production of a hydroxy radical produced according to a reaction formula such as $H_2O_2+M \rightarrow .OH+OH^-+M^+$ or $H_2O_2+M \rightarrow .OOH+H^++M$ and can react with a hydroxy radical to convert the hydroxy radical into hydroxide ion (M is a catalyst having a radical-decomposing function). Due to this catalyst, the electrolyte membrane can be prevented from deterioration due to a hydroxy radical.

The method for incorporating this catalyst into the electrolyte membrane is not particularly limited, but a metal oxide or a salt, etc., of the pertinent transition metal may be dispersed in a solution of a polymer electrolyte and then the polymer electrolyte may be solidified into a solid oxide, or the pertinent transition metal may be incorporated in the form of a soluble or insoluble salt or other compounds into a polymer electrolyte and then formed into a solid oxide by hydrolysis, a sol-gel reaction, a redox reaction or other reactions.

The transition element or rare earth element having a catalytic ability of decomposing a peroxide is not particularly limited as long as it is an element, capable of swiftly decomposing a peroxide (particularly, hydrogen peroxide) produced in an electrode layer during operation of a polymer electrolyte fuel cell. Such a transition element or rare earth element includes, for example, cerium, tungsten, ruthenium, palladium, silver, rhodium, zirconium, yttrium, manganese, molybdenum, lead, vanadium, and titanium.

EXAMPLES

The present invention is described below by referring to Examples, but the present invention should not be construed as being limited to these Examples.

1. Production of Compounded PTFE Porous Membrane

A material higher in the modulus of elasticity than a material constituting a PTFE porous membrane was compounded with the inner pore surface of the PTFE porous membrane to produce a compounded PTFE porous membrane. Several kinds of compounded PTFE porous membranes were produced by changing the content percentage or kind of the material compounded with the PTFE porous membrane. A non-compounded PTFE porous membrane was also produced. The obtained porous membranes were measured for the modulus of elasticity.

Specific conditions for the production of the compounded PTFE porous membranes are described below.

Examples 1 to 4

An $SiO_x$ (vitreous substance) coat agent (Siragusital B4547, Shin-Gijutsu Sogo Kenkyu-Sho) was diluted with IPA and thereby adjusted to a predetermined concentration. The concentration-adjusted solution was coated on the inner pore surface of expanded porous PTFE (produced by W. L. Gore & Associates, Co., Ltd.) [porosity: 80%, average pore diameter: 0.2 µm, membrane thickness: 8 µm] shown in Comparative Example 1, which was not processed in particular, and dried for 5 minutes in an oven at 60° C. to produce an expanded porous PTFE membrane in which SiOx was fixed to the surface. The amount of SiOx fixed was quantified by a fluorescent X-ray analyzer (XRF-1700, manufactured by Shimadzu Corporation).

Example 5

An $SiO_x$ (vitreous substance) coat agent (Siragusital B4547, Shin-Gijutsu Sogo Kenkyu-Sho) was diluted with IPA and thereby adjusted to a predetermined concentration. The concentration-adjusted solution was coated on the surface of expanded porous PTFE (produced by W. L. Gore & Associates, Co., Ltd.) shown in Comparative Example 2, the surface of which was coated with cerium oxide, and dried in an oven at 60° C. to produce an expanded porous PTFE membrane in which SiOx was fixed to the surface. The amount of SiOx fixed was quantified by a fluorescent X-ray analyzer (XRF-1700, manufactured by Shimadzu Corporation).

Comparative Example 1

Expanded porous PTFE (produced by W. L. Gore & Associates, Co., Ltd.) not subjected to a coating treatment was used as an object for comparison.

Comparative Example 2

Expanded porous PTFE (produced by W. L. Gore & Associates, Co., Ltd.) of which the surface is coated with cerium oxide was used as an object for comparison. As to the method for coating cerium oxide, the same method as in Examples was employed.

Measurement of Modulus of Elasticity:

The modulus of elasticity of the PTFE porous membranes obtained in Examples and Comparative Examples above was determined. As to the measurement conditions, an S/S curve was acquired at a tensile speed of 200 mm/min by using a tensile compression tester (RTG-1210, A & D Co., Ltd.) under the conditions of 23° C. and 50% RH, and the modulus of elasticity at an elongation of 2% was calculated. The modulus of elasticity was measured in each of the MD direction and the TD direction.

With respect to the PTFE porous membranes of Examples and Comparative Examples, the content percentage of the coating material (SiOx) and the modulus of elasticity are shown in Table 1. Incidentally, these PTFE porous membranes were observed by as electron microscope, and as a result, it was confirmed that pores were not blocked with the coating material and a porous structure was maintained.

TABLE 1

Modulus of Elasticity of Each Material

|  | Content Percentage of Coating Material, % | Modulus of Elasticity (MD), MPa | Modulus of Elasticity (TD), MPa |
|---|---|---|---|
| Example 1 | 1.0 | 160 | 75 |
| Example 2 | 1.8 | 200 | 85 |
| Example 3 | 11 | 280 | 140 |
| Example 4 | 25 | 440 | 220 |
| Example 5 | 1.3 | 291 | 210 |
| Comparative Example 1 | — | 130 | 45 |
| Comparative Example 2 | — | 148 | 112 |

In Comparative Examples, fixation of SiOx was not measured. In Comparative Example 2 (Example 5), $CeO_2$ was measured, and the $CeO_2$ content percentage was 1%.

It was confirmed that as the content percentage of the coating material (SiOx) is increased, the modulus of elasticity (MD) and the modulus of elasticity (TD) become higher. In both Comparative Examples, the modulus of elasticity was less than 150 MPa.

2. Production of Electrolyte Membrane

Each of the porous membranes in Examples 1 to 5 and Comparative Examples 1 and 2 was impregnated with a polymer electrolyte (ion-exchange resin) solution (produced by W. L. GORE & Associates, Inc.) (basis weight: 20 g/m$^2$) and dried for 5 minutes in an oven at 100° C. to obtain a solid polymer electrolyte membrane (thickness: 10 µm) reinforced with expanded porous PTFE. With respect to the obtained solid polymer electrolyte membrane, the dimensional change ratio when swelled and the power generation performance when assembled into MEA were measured.

3. Measurement of Ratio of Dimensional Change Due to Swelling

The dimension when dry of the electrolyte membrane using the porous membrane obtained in each of Examples 1 to 5 and Comparative Examples 1 and 2 was measured by means of a CNC image measuring system (NEXIV, manufactured by Nikon Corp.). Subsequently, the electrolyte membrane was boiled for 10 minutes in ion-exchanged water kept at 100° C. and after taking out the electrolyte membrane from hot water, the dimension when swelled was swiftly measured by means of the image measuring system. Using the obtained dimensions when dry and when swelled, the dimensional change ratio was calculated according to the following formula:

Dimensional change ratio={(dimension when swelled)−(dimension when dry)}/(dimension when dry)×100

The dimensional change ratio is shown in Table 2.

TABLE 2

Dimensional Change Ratio of Electrolyte Membrane

| | Dimensional Change Ratio (MD) % | Dimensional Change Ratio (TD) % |
|---|---|---|
| Example 1 | less than 0.5 | 4.6 |
| Example 2 | less than 0.5 | 3.9 |
| Example 3 | less than 0.5 | 3.7 |
| Example 4 | less than 0.5 | 2.5 |
| Example 5 | less than 0.5 | 6.4 |
| Comparative Example 1 | −1.7 | 5.4 |
| Comparative Example 2 | −1.1 | 7.9 |

In all Examples, the dimensional change in the MD direction was less than 0.5%, and good dimensional stability was exhibited. With respect to the TD direction, in Examples 1 to 4 (where SiOx coating was applied to Comparative Example 1), the dimensional change ratio was decreased from that in Comparative Example 1, confirming that the dimensional stability was improved. In Example 5 (where SiOx coating was applied to Comparative Example 2), the dimensional change ratio was decreased from that in Comparative Example 2, confirming that the dimensional stability was improved.

4. Production of Membrane Electrode Assembly and Power Generation Test

A membrane electrode assembly (MEA) used for cell evaluation was prepared by the following procedure. The obtained electrolyte membrane was disposed is the center and hot pressed with PRIMEA. (registered trademark) #5584 (amount of Pt supported: 0.1 mg/cm$^2$: produced by W. L. Gore & Associates, Co., Ltd.) used for the anode electrode and PRIMEA (registered trademark) #5580 (amount of Pt supported: 0.4 mg/cm$^2$: produced by W. L. Gore & Associates, Co., Ltd.) used for the cathode electrode, and MEA was produced by a decal method.

Each membrane electrode assembly was disposed between two sheets of water-repellent carbon paper (CARBEL (registered trademark) CNW20B: produced by W. L. Gore & Associates, Co., Ltd.) and incorporated into a power generation cell, and an initial power generation test was performed at a cell temperature of 80° C. by supplying hydrogen (utilization ratio: 77%)/air (utilization ratio: 50%) under normal pressure. As for the gas dew point, under a high humidification condition, a gas having a dew point of 80° C. was supplied to both the anode and the cathode. In addition, under a low humidification condition, a gas having a dew point of 55° C. was supplied to both the anode and the cathode. In the case of the low humidification condition, a back pressure of 50 kPa was applied. The obtained current density at a cell voltage of 0.6 V is shown in Table 3.

TABLE 3

Current Density at 0.6 V of Each Membrane Electrode Assembly

| | Current Density (High Humidification Condition), A/cm$^2$ | Current Density (Low Humidification Condition), A/cm$^2$ |
|---|---|---|
| Example 1 | 1371 | 1537 |
| Example 2 | 1354 | 1482 |
| Example 3 | 1269 | 1434 |
| Example 4 | 1097 | 884 |
| Example 5 | 1253 | 1450 |
| Comparative Example 1 | 1285 | 1464 |
| Comparative Example 2 | 1259 | 1398 |

It was confirmed that compared with Comparative Examples where coating of SiOx was not performed, in many of Examples where coating of SiOx was performed, the current density is enhanced or almost equivalent. However, it was confirmed that the current density tends to decrease as the content percentage of SiOx coating is increased. It is likely that this tendency is due to a relative decrease in the proportion of the polymer electrolyte (ion-exchange resin).

The invention claimed is:

1. An electrolyte membrane for a fuel cell, comprising a polymer electrolyte and a polytetrafluoroethylene (PTFE) porous membrane, wherein:
   the inner pore surface of said PTFE porous membrane is compounded with a material higher in the modulus of elasticity than a material constituting said PTFE porous membrane,
   wherein said compounded PTFE porous membrane has a modulus of elasticity of 150 MPa or more in at least one direction (MD or TD) or in both directions (MD and TD),
   wherein said compounded PTFE porous membrane has a continuous porous structure, and
   wherein pores of the continuous porous structure have an average pore diameter between 0.01 and 50 micrometers.

2. The electrolyte membrane according to claim 1, wherein said polymer electrolyte is a fluorinated ionomer.

3. The electrolyte membrane according to claim 1, wherein PTFE constituting said PTFE porous membrane is expanded porous PTFE.

4. The electrolyte membrane according to claim 1, wherein said material having a high modulus of elasticity contains at least one of SiO$_x$, P$_2$O$_5$, PbO, SrO, BaO and ZrO$_2$.

5. The electrolyte membrane according to claim 1, wherein said material having a high modulus of elasticity contains polybenzimidazole (PBI).

6. The electrolyte membrane according to claim 1, wherein the content of said material having a high modulus of elasticity is from 1.0 to 11 wt % based on said PTFE porous membrane.

7. The electrolyte membrane according to claim 1, which further contains a catalyst having a radical-decomposing function.

8. The electrolyte membrane according to claim 7, wherein said catalyst having a radical-decomposing function contains at least one of cerium, tungsten, ruthenium, palladium, silver, rhodium, zirconium, yttrium, manganese, molybdenum, lead, vanadium and titanium.

9. The electrolyte membrane according to claim 1, wherein the polytetrafluoroethylene (PTFE) porous membrane has a thickness between 1 and 30 micrometers.

10. The electrolyte membrane according to claim 1, wherein the polytetrafluoroethylene (PTFE) porous membrane has a porosity of at least 35%.

11. The electrolyte membrane according to claim 1, wherein the PTFE porous membrane is free of vinylidene fluoride.

12. The electrolyte membrane according to claim 1, wherein the material having a high modulus of elasticity has a content percentage between 1.0 and 11 weight % based on the polytetrafluoroethylene (PTFE) porous membrane.

* * * * *